Dec. 21, 1965　　　　　E. N. YEARY　　　　　3,224,614
BRACKET MEANS FOR SIDE-LOADING OF VEHICLES
Filed Oct. 6, 1964　　　　　　　　　　　　　3 Sheets-Sheet 1

INVENTOR
EDWIN N. YEARY

BY　W. E. Sherwood
　　　　　　　ATTORNEY

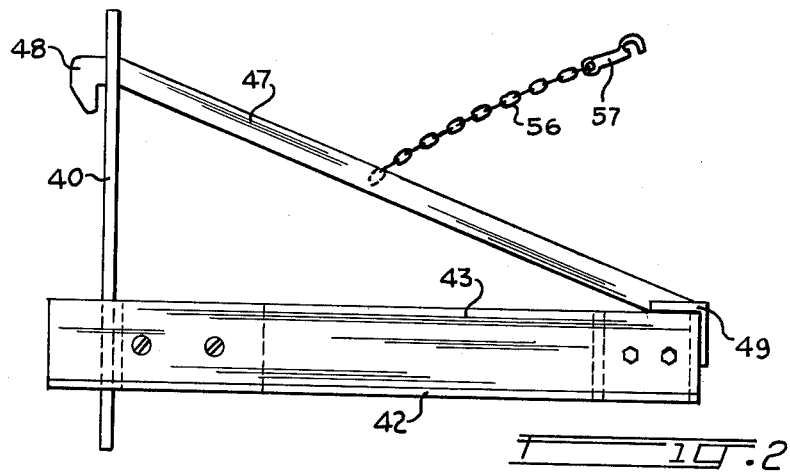
_Fig. 2_
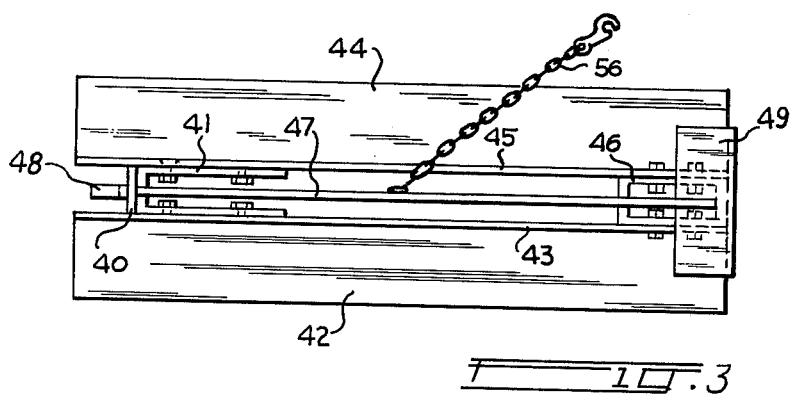
_Fig. 3_
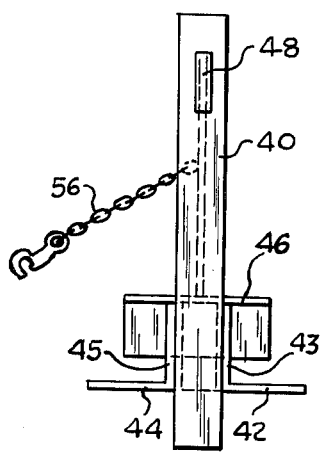
_Fig. 4_
INVENTOR
EDWIN N. YEARY
BY   W. E. Sherwood
ATTORNEY Dec. 21, 1965   E. N. YEARY   3,224,614
BRACKET MEANS FOR SIDE-LOADING OF VEHICLES
Filed Oct. 6, 1964   3 Sheets-Sheet 3
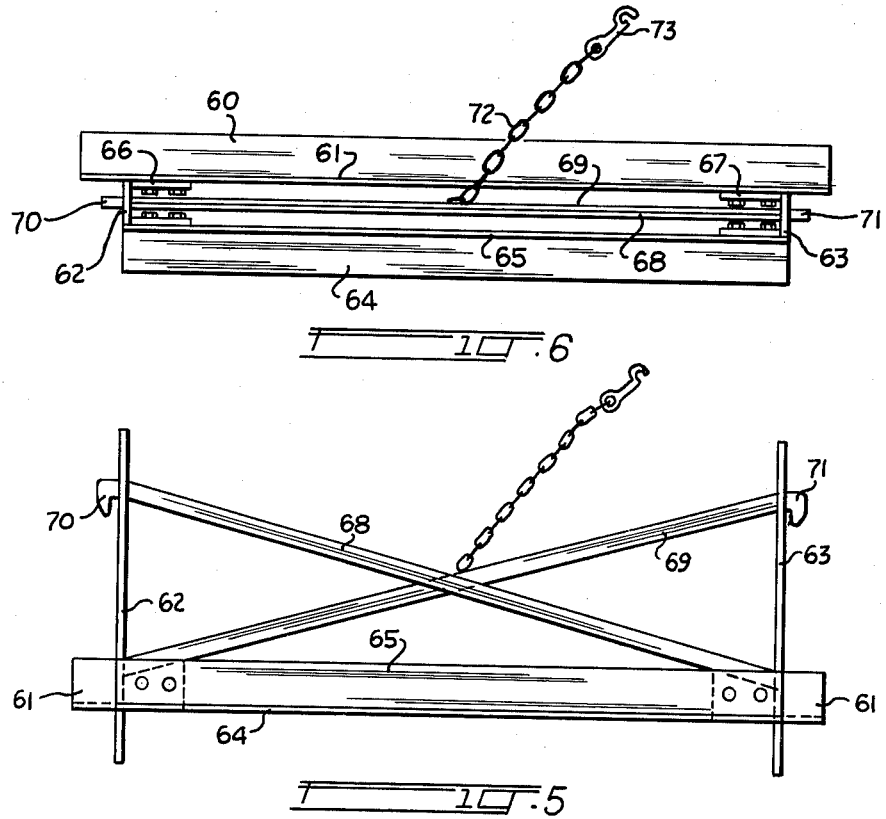
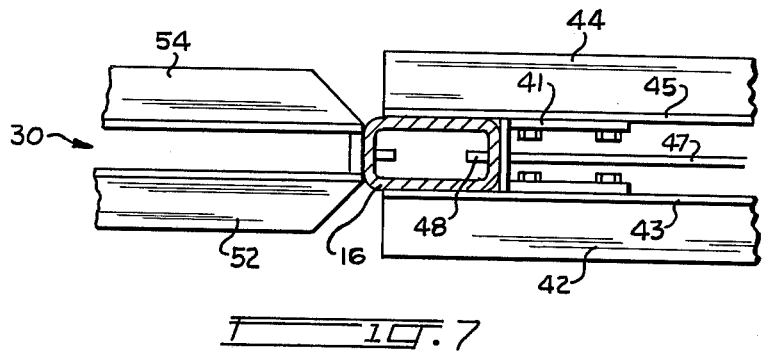
INVENTOR
EDWIN N. YEARY
BY W. E. Sherwood
ATTORNEY

United States Patent Office 3,224,614
Patented Dec. 21, 1965

3,224,614
BRACKET MEANS FOR SIDE-LOADING OF VEHICLES
Edwin N. Yeary, Lexington, Ky., assignor to Yeary Transfer Company, Inc., Winchester, Ky., a corporation of Kentucky
Filed Oct. 6, 1964, Ser. No. 401,779
9 Claims. (Cl. 214—500)

This invention relates to the handling of heavy articles which are to be loaded and unloaded from the sides of transporting vehicles, and more particularly to an improved bracket means serving to increase the loading capabilities of such vehicles without requiring special load-lifting equipment.

As an illustration, in the handling of loaded tobacco hogsheads, which may weigh as much as 1000 pounds, overhead cranes or high-lift fork trucks may be used to raise the load. However, when this elevated load is to be moved to or from the proper space within the vehicle, interference of the load-lifting equipment with the sides or roof of the vehicle is likely to occur. Various proposals to overcome this problem have been advanced, but so far as I am aware, have been accompanied by certain disadvantages which it is a purpose of my invention to overcome. The use of detachable loading brackets is an old expedient, but when large and heavy articles are to be safely supported by such brackets, the particular construction of the bracket requires special attention.

An object of the invention is to provide a simplified, reliable and inexpensive loading bracket for employment with side-loaded vehicles and requiring no expensive modifications of the vehicles for use with the bracket.

Another object is to provide an improved cantilever type loading bracket which may be readily attached to and detached from a supporting column and which safely supports a heavy load without damage to the bracket or to the column.

These and other objects and advantages of the invention will become more apparent as the description proceeds and when considered in conjunction with the accompanying drawings in which, FIG. 1 is a perspective view of a partially loaded vehicle showing the bracket in one of its loading positions.

FIG. 2 is a side elevation view of the form of bracket employed with central columns of the vehicle.

FIG. 3 is a plan view of the bracket seen in FIG. 2.

FIG. 4 is an end elevation view of the bracket seen in FIG. 2.

FIG. 5 is a side elevation view of the form of bracket employed with a corner column of the vehicle.

FIG. 6 is a plan view of the bracket seen in FIG. 5, and

FIG. 7 is a horizontal sectional view through one of the central columns above the vehicular rail and showing a portion of a bracket in position for cooperation with the vehicular rail.

Figure 1:
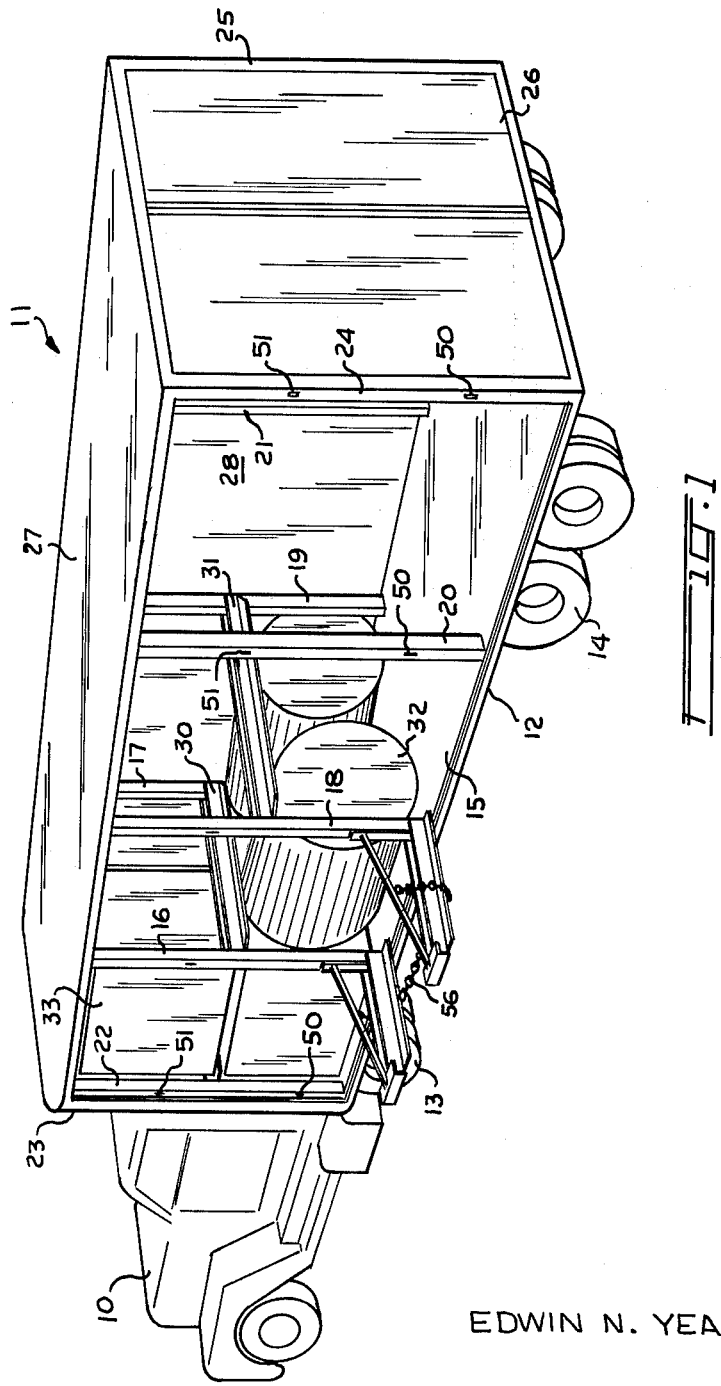

Referring now to FIG. 1, a side-loading vehicle of the general type disclosed in Yeary Patent No. 3,146,017 is especially well adapted for use with the present invention and includes a tractor 10 for hauling a trailer indicated generally at 11. This trailer comprises essentially a flat bed frame 12 with a mobile support therefor including the wheels 13 and 14 respectively of the tractor and trailer. Attached at each side of the frame and extending upwardly from the floor 15 of the vehicle are pairs of hollow uprights or columns 16–17; 18, 19; and 20–21, it being understood that while only three such pairs of central columns are shown, a conventional large capacity vehicle may employ a greater number of such columns.

At the forward end of the trailer vertical corner columns, one of which is shown at 22, have attached thereto a front end wall 23, and at the rear end of the trailer, vertical corner columns 24 and 25 support a conventional rear door 26. The side edge of the front wall and the hinging of the door are generally flush with the outer surfaces of the respective corner columns 22 and 24, the significance of which will appear later. A rigid roof 27 is attached to the upper ends of the several columns and a fixed side wall 28 is attached to the columns on the side of the trailer opposite its loading side. A suitable siding (not shown) is provided to enclose the vehicle when loaded, and may take the form of a withdrawable flexible siding as disclosed in the aforementioned patent.

The vehicle is adapted to carry articles in two tiers and for the purpose of supporting the upper tier of articles out of contact with the lower tier of the same, a sturdy, load-supporting beam is detachably mounted upon and between corresponding side columns. Two such beams are shown at 30 and 31 and include rail portions along which heavy articles are shoved or rolled into and from loaded position. Such articles may, for example, comprise hogshead 32 with a diameter of about 47 inches, or may comprise rectangular shaped containers 33 with suitable dimensions for the space to be occupied.

Passing now to FIGS. 2 to 4, there is provided for loading of such articles a pair of identical brackets and, which together with a single reversible bracket of the type shown in FIGS. 5 and 6, are either carried with the vehicle or else are provided at the loading and unloading sites. As seen in FIGS. 2 and 3, a typical bracket includes a vertical elongated back plate 40 formed of metal and having a bifurcated spacer 41 welded to its forward surface adjacent the lower end of the plate. Attached to the legs of this spacer is a first rail having a horizontal flange 42 and a vertical flange 43, and a second rail having corresponding flanges 44 and 45. The spacer is of such width that the extensions of the two rails rearwardly of plate 40 lie outboard of the sides of the vehicular column to which the bracket is attached, and thus embrace the column, as seen in the assembly view of FIG. 1.

A second spacer 46 of like width is interposed between the rails at the outer end of such rails and is rigidly fastened thereto thus to cause flanges 43 and 45 to be in generally parallel planes which coincide generally with the planes of the vertical flanges of the load supporting beams within the vehicle as later to be described. Welded to both the top edges of flanges 43 and 45 and to the exposed outer edge of both rails is an article-blocking member 49, the lateral edges of which extend a sufficient distance from the vertical flanges of the rails to engage the edge of an article deposited either on the first or the second bracket rail and tending to move outwardly along such rail.

An inclined brace 47 is attached at one end to the member 46 and at the other end to the upper portion of plate 40. In a preferred form, the upper end of the brace projects beyond the plate and comprises a bracket-securing means in the form of a sturdy hook 48, which as seen in FIG. 7 engages in a slot formed in the outer surface of the hollow columns. As noted in FIG. 1, each of the columns on the loading side of the vehicle includes uniformly shaped lower slots 50 and upper slots 51 serving as a means for detachably engaging the bracket in cooperation with the hook serving as the bracket-securing means. Other equivalent means for effecting the detachable mounting of the brackets may be employed without departing from the invention, as for example, a projection on the columns engageable in a slot on the back plate 40. However, when a flexible siding is employed on the vehicle the absence of projections on the columns is preferable.

Depending upon whether the article being loaded is to rest in the lower or upper tier, the bracket hook 48 will be engaged in either the lower slot 50 or in the upper slot 51. When the article is to rest on the floor 15, the horizontal flanges 42 and 44 of the bracket rails coincide generally with the plane of that floor as shown in FIG. 7, when the article is to rest on a load-supporting beam the bracket flanges 42 and 44 lie in extension of the corresponding horizontal flanges 52 and 54 of the vehicular beams. As will be understood, the vehicular beam is provided with appropriate means at its end for detachably engaging the respective pairs of columns and for supporting the beam and its load.

As will now be apparent, the bracket with its two rail portions can accept articles for loading on either rail thus reducing the number of times the bracket requires detachment from the columns during the loading of the entire vehicle. Moreover, the bracket rails are equally adaptable for loading onto the flat floor surface 15 or onto the vehicular beam rails. As a safety feature to prevent accidental spreading of the pair of cooperating brackets, a chain or the like 56 is attached to the brace 47 and has at one end a detachable fastening 57 for engagement with a similar fastening on the companion bracket. The respective chains, when in use, are trained through the open space between the flanges 43 and 45 of the bracket, extend under the bracket as shown in FIG. 1, and join with the companion chain.

The invention further comprehends the use of a bracket which is employed at the corner columns of the vehicle and wherein the embracing of both sides of such a column is prevented by the vehicular front wall or rear door. In this modification, I provide a bracket which is reversible end for end, and which is equally adaptable for use on the vehicular columns 22 and 24. As seen in FIGS. 5 and 6, this bracket includes a longer rail having flanges 60 and 61 projecting beyond the back plates 62 and 63 and a shorter rail having flanges 64 and 65 which terminate at the edges of these back plates. A pair of spacers 66 and 67 welded to the respective back plates and to which spacers the rails are suitably affixed, are provided.

Inclined braces 68 and 69 are rigidly attached at one end to the respective back plates and have hooks 70 and 71 for engaging with the slot in the column as above described. The hook to be engaged depends upon which end of the reversible bracket is being mounted as determined by whether the bracket is being mounted on the front corner column 22 or the rear corner column 24. A chain 72 with fastening means 73 is attached to brace 69 to cooperate with the chain 56 of the companion bracket.

The employment of the described brackets during a loading operation will now be evident to those skilled in the art. As the elevated heavy article is lowered into contact with the horizontal flanges of the pair of brackets being used, the article on the bracket is centered with respect to the space it is to occupy in the vehicle. The bracket loading is transmitted to, and shared by, the two vehicular columns on which the pair of brackets are mounted, and the elongated back plates of the brackets as well as the column enveloping end of at least one bracket, serve to help distribute the loading on the columns. At all times at least one of the brackets will present an obstacle in the form of the member 49 to the reverse movement of the article being loaded, in case it tends to slide outwardly from the vehicle. The unloading of the vehicle is equally safe and expeditious. By providing the reversible bracket for use with the end columns, the vehicular construction does not require modification.

Having thus described the invention in a preferred embodiment, it will be understood that changes and modifications may be made therein without departing from the scope or spirit of the invention as defined by the appended claims.

What I claim is new and desire to secure by Letters Patent of the United States, is:

1. In combination, a vehicle adapted for side-loading and comprising an elongated flat bed frame and a mobile support therefor, a plurality of spaced pairs of vertical columns attached to said frame at the respective sides thereof, a plurality of horizontal rails having flanges for supporting heavy articles above the floor of said vehicle, said rails extending transversely of said vehicle and being affixed at the ends to the respective pairs of columns, each of said columns on the loading side of said vehicle having means for detachably engaging a bracket, and a pair of cantilever brackets mounted upon two adjacent columns at the loading side of said vehicle, and projecting outwardly therefrom; each of said brackets including a vertically extending back plate in contact with the column mounting the same, a bracket-securing means for detachably connecting the bracket and the bracket-engaging means of the column to each other, and a pair of rails affixed to said back plate below said bracket-securing means and on opposite sides of said back plate, each of said bracket rails being adapted to support articles prior to moving the same into stowed positions on corresponding sides of the column to which said brackets are respectively attached.

2. Apparatus as defined in claim 1 wherein said bracket-engaging means of said column is located above said horizontal rail of said vehicle thereby to position said bracket rails in substantially the same plane as said vehicular rail.

3. Apparatus as defined in claim 1 wherein said bracket-engaging means of said column is located above the floor of said vehicle and below said vehicular rail thereby to position said bracket rails in substantially the same plane as said floor of said vehicle.

4. For use in the moving of heavy articles into and from the spaces between adjacent vertical columns on the side of a flat bed vehicle; a bracket comprising a vertical back plate adapted to contact the outer surface of the vehicle side columns, a first rail and a second rail attached to said plate adjacent the inner end of said rails and extending normally to said plate, an inclined brace attached to said rails adjacent the outer end of said rails and attached to said plate above the junction of said rails and plate, and means on said bracket for detachably securing the bracket upon a side column of the vehicle, each of said rails including a horizontal flange for supporting the article to be handled and a vertical flange for positioning the article with respect to the space between adjacent columns, said vertical flange lying outboard of the corresponding side of the column to which said bracket is attached.

5. A bracket as defined in claim 4 wherein the extreme inner ends of each of said rails project beyond said back plate and embrace the column to which said bracket is attached.

6. A bracket as defined in claim 4 wherein the extreme inner end of one of said rails projects beyond said back plate to embrace one side of the column to which said bracket is attached and the extreme inner end of the other of said rails terminates substantially flush with the mounting surface of said back plate.

7. A bracket as defined in claim 4 wherein said bracket-securing means comprises a projection integrally formed on the upper end of said brace and adapted to engage in a slot in the column supporting said bracket.

8. A bracket as defined in claim 4 including an article-blocking member attached to each of said rails adjacent the outer end thereof and projecting laterally thereof above the horizontal flanges of said rails.

9. For use in the moving of heavy articles into and from the spaces between adjacent vertical columns on the side of a flat bed vehicle; a bracket reversible end for end and comprising first and second vertical back plates having column-contacting surfaces, a first rail attached to said back plates adjacent the lower ends of the same and projecting beyond each of said back plates, a second rail attached to each of said back plates adjacent the lower ends of the same and terminating substantially flush with the column-contacting surfaces of said back plates, first and second inclined braces each attached at a lower end to one of said back plates and at an upper end to the other of the respective back plates above said rails, each of said braces having means at its upper end for detachably securing the bracket upon a side column of the vehicle, each of said bracket rails including a horizontal flange for supporting the article to be handled and a vertical flange for positioning the article with respect to the space between adjacent columns, said vertical flange lying outboard of the corresponding side of the column to which said bracket is attached.

References Cited by the Examiner

UNITED STATES PATENTS

| | | | |
|---|---|---|---|
| 1,317,776 | 10/1919 | Claus | 214—16.42 |
| 2,191,701 | 2/1940 | Wood | 248—243 |
| 2,875,902 | 3/1959 | Ayars | 214—16.4 |

GERALD M. FORLENZA, *Primary Examiner.*